(12) United States Patent
Nakanishi et al.

(10) Patent No.: US 6,735,659 B1
(45) Date of Patent: May 11, 2004

(54) METHOD AND APPARATUS FOR SERIAL COMMUNICATION WITH A CO-PROCESSOR

(75) Inventors: Tosaku Nakanishi, Saratoga, CA (US); Siripong Sritanyaratana, Union City, CA (US)

(73) Assignee: Intel Corporation, Santa Clara, CA (US)

(*) Notice: Subject to any disclaimer, the term of this patent is extended or adjusted under 35 U.S.C. 154(b) by 463 days.

(21) Appl. No.: 09/746,086

(22) Filed: Dec. 21, 2000

(51) Int. Cl.⁷ .............................................. G06F 13/14
(52) U.S. Cl. ........................................ 710/305; 712/34
(58) Field of Search ................................ 710/100, 305; 712/32–38

(56) References Cited

U.S. PATENT DOCUMENTS

| | | | | |
|---|---|---|---|---|
| 4,864,567 A | * | 9/1989 | Giorgio ........................ 370/359 |
| 5,313,586 A | * | 5/1994 | Rutman ........................ 712/34 |
| 5,416,908 A | * | 5/1995 | DiCarlo et al. ................ 710/34 |
| 5,471,414 A | * | 11/1995 | Kumar et al. ................. 708/714 |
| 5,802,382 A | * | 9/1998 | Greenberger et al. ......... 712/36 |
| 5,854,908 A | * | 12/1998 | Ogilvie et al. ............... 710/312 |
| 5,926,583 A | * | 7/1999 | Iwase et al. ................. 382/304 |
| 5,958,024 A | * | 9/1999 | Typaldos et al. ............. 710/26 |
| 6,029,223 A | * | 2/2000 | Klein ........................ 710/266 |
| 6,128,311 A | * | 10/2000 | Poulis et al. ................. 370/463 |
| 6,334,179 B1 | * | 12/2001 | Curran et al. ................. 712/34 |
| 6,339,808 B1 | * | 1/2002 | Hewitt et al. ............... 710/260 |
| 6,631,465 B1 | * | 10/2003 | Chen et al. ................. 712/234 |
| 2002/0091826 A1 | * | 7/2002 | Comeau et al. ............. 709/226 |

* cited by examiner

*Primary Examiner*—Sumati Lefkowitz
(74) *Attorney, Agent, or Firm*—Blakely, Sokoloff, Taylor & Zafman LLP

(57) ABSTRACT

A method and apparatus for serial communication with a co-processor. In one embodiment, a microprocessor is provided with a CPU core, set of serial interface registers, a serial interface unit, to provide serial communication between a co-processor and the microprocessor. The set of serial interface registers is part of a register file of the CPU core and interrupts are exchanged between the CPU core and the co-processor to allow for reading and writing of data placed in the serial registers of the register file.

28 Claims, 3 Drawing Sheets

METHOD AND APPARATUS FOR SERIAL COMMUNICATION WITH A CO-PROCESSOR

BACKGROUND

As more functionality is integrated into the PC platform by the inclusion of an increasing number of semiconductor devices, system attributes such as system power consumption, cost, and performance also increase. Performance concerns may be addressed by such methods as coupling devices to the microprocessor directly by placing them on the microprocessor's Front-Side Bus (FSB). This technique helps to avoid some of the arbitration bottlenecks resulting when several devices are coupled to the microprocessor via a core-logic chipset, such as a Memory Controller Hub (MCH) or "north bridge" chipset. This method also allows such devices to have a more direct path to system memory resources, thereby reducing the need for costly local memory.

However, cost and power issues may arise due to the added bus logic needed to interface devices to the FSB that are "asymmetric" in relation to the microprocessor architecture. The term "asymmetric" refers to non-uniformity of bus-interface architecture and bus protocol between a device, such as a co-processor, and a microprocessor coexisting on the FSB. One approach to this problem is to integrate additional bus logic into the substrate of the co-processor. However, this may result in only marginal improvements in power consumption and system cost, since the amount of bus logic is not significantly reduced.

Therefore, existing methods of interfacing a microprocessor to a co-processing device are not optimal for improving system performance, cost, and power consumption.

DETAILED DESCRIPTION

The present disclosure provides a method and apparatus for serial communication between a microprocessor and a co-processor. In one embodiment, the co-processor is a communications processor. However, one of ordinary skill in the art would appreciate that the scope of the invention is not limited to a communications processor. Rather, the method and apparatus disclosed herein may be applied to interface a microprocessor to other programmable processing devices not explicitly disclosed.

Figure 1:
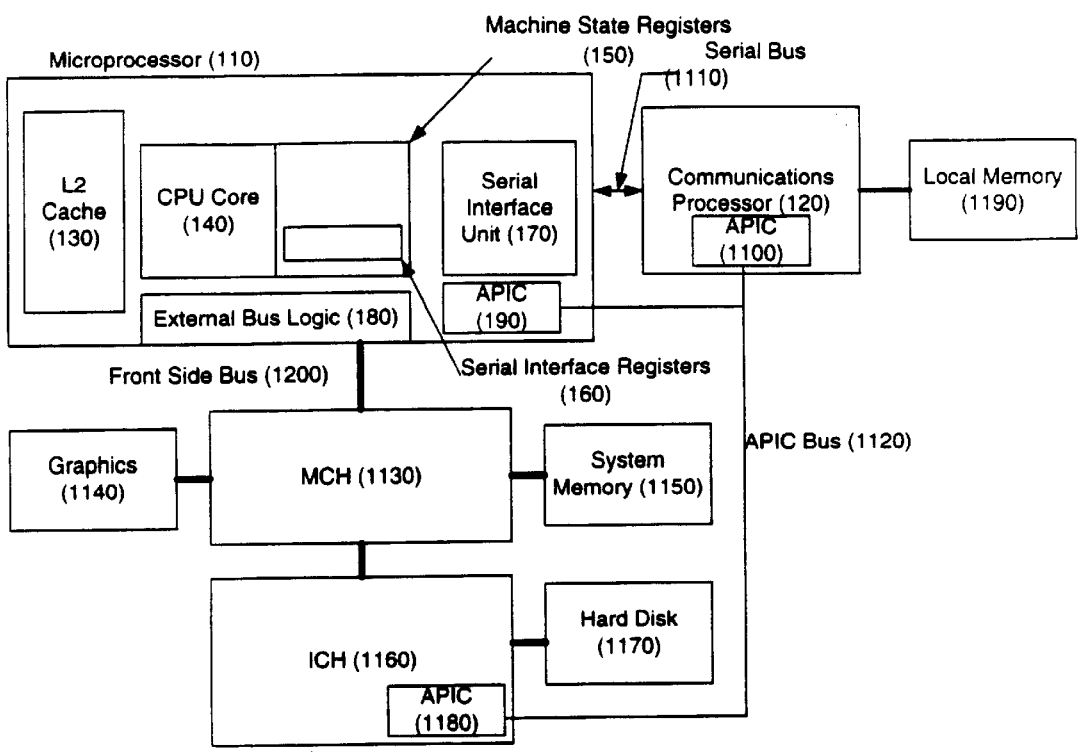
FIG. 1 is a block diagram illustrating one embodiment.

FIG. 1 is a block diagram illustrating one embodiment comprising a microprocessor 110 coupled directly to a communications processor 120 via a serial bus 1110. In this embodiment, address and data information are transmitted serially between the microprocessor and the communications processor to enable the communications processor to access memory, such as the L2 cache 130, system memory 1150, and Input/Output (I/O) resources, such as the system hard disk 1170. A serial interface unit 170 sends and receives data and addresses intended for or originating from the communications processor. Serial interface registers 160 contained within the machine state register file 150 store data and addresses written or read by the communications processor. In the case of a data/address write from the communications processor, the CPU core may forward data and address information received from the communications processor to an L2 cache or to other memory or I/O resources via a Memory Controller Hub (MCH) 1130 or I/O Controller Hub (ICH) 1160.

In one embodiment, an MCH arbitrates memory accesses made by various devices, including the communications processor and a graphics accelerator 1140. The communications processor makes data transfer requests to the CPU core via an Advanced Programmable Interrupt Controllers (APIC) 1100. An APIC may be programmed to decode and control interrupts generated by devices within a computer system requesting CPU resources. In one embodiment, the APIC decodes read and write operations from a co-processor, such as a communications processor, and causes the CPU to invoke the appropriate interrupt handling routine to service the request. The requests are interpreted by an APIC 190, which generates an interrupt to the CPU core. An interrupt handling routine services the data transfer requests by transferring data between the serial interface registers and the addressed memory or I/O resource.

Figure 2:
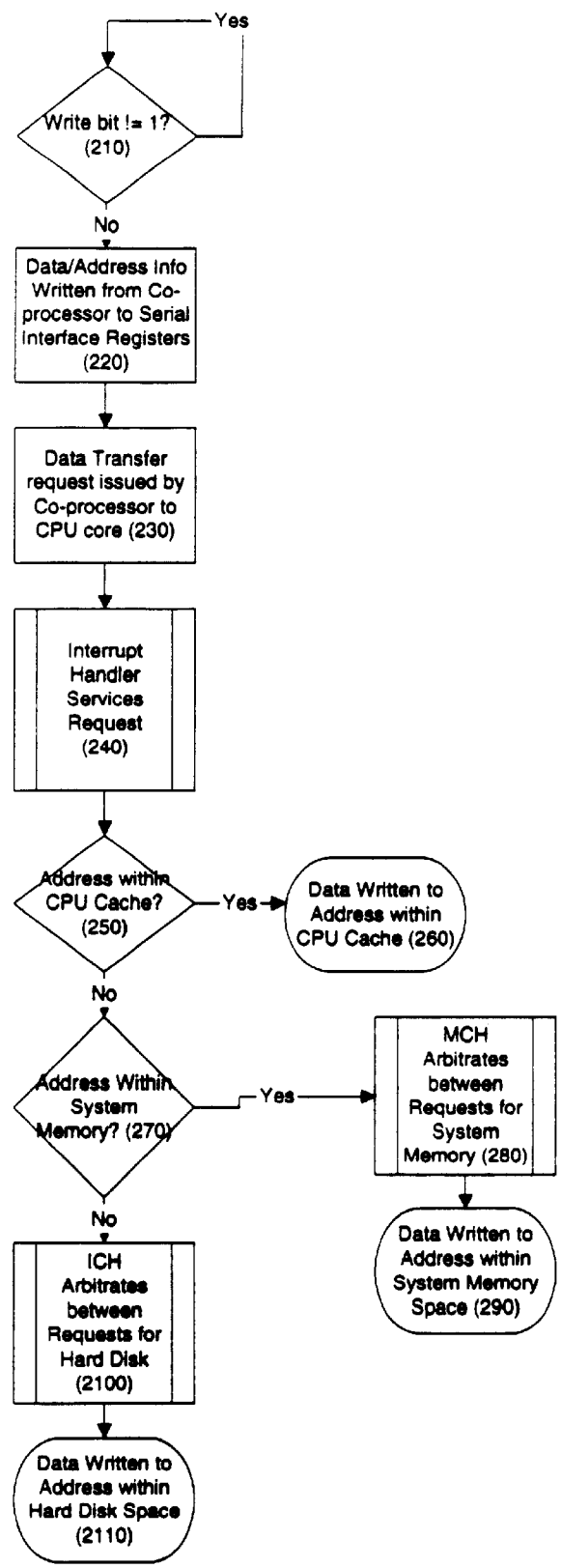
FIG. 2 is a flow diagram illustrating one embodiment of a write operation

FIG. 2 illustrates one embodiment in which data and addresses originating from a co-processor, such as a communications processor, are written to I/O or memory. First, a co-processor reads 210 the Write Bit stored within the serial interface registers of the microprocessor, which indicates that new data may be written to the serial interface registers. Once the Write Bit is set to a "1", the co-processor may transfer data 220 and corresponding target addresses to the serial interface registers. After the data and addresses are written to the serial interface registers, the co-processor issues a "request" 230 for the CPU core to write the data contained within the serial interface registers to the corresponding target address.

In one embodiment the "request" from the co-processor is an interrupt generated by an APIC associated with the co-processor. The interrupt is decoded by an APIC associated with the microprocessor which generates an interrupt to the CPU core, causing an interrupt service routine 240 to be executed. The CPU core then writes the data to the corresponding target address. In one embodiment, the data may be written to the CPU L2 cache, system memory, or an I/O resource, such as a hard disk, depending on the target address. If the target address is within the L2 cache memory range 250, the data is written to the L2 cache 260. If the address is within the system memory range 270, the data is forwarded to the MCH, which may arbitrate 280 between the co-processor and other devices for access to system memory. The MCH then writes 290 the data to the target address within system memory. If the address is not within the system memory range, the data is forwarded to the ICH which may arbitrate 2100 between the coprocessor and other system devices for access to I/O resources. The ICH then writes 2110 the data to the target address within the various I/O resources, such as a hard disk.

Figure 3:
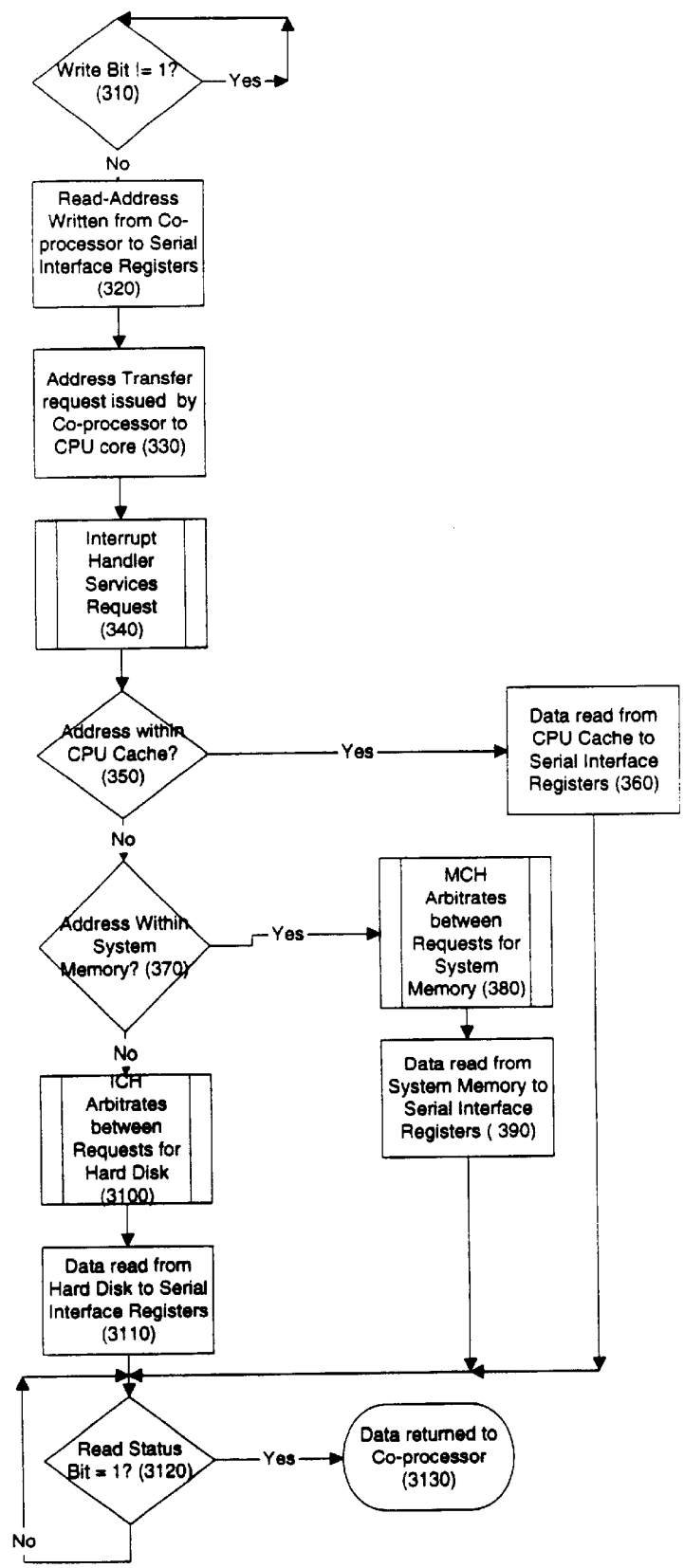
FIG. 3 is a flow diagram illustrating one embodiment of a read operation

FIG. 3 illustrates one embodiment in which data and addresses originating from a memory or I/O resource are read by a co-processor, such as a communications processor. First, a co-processor reads the Write Bit stored within the serial interface registers of the microprocessor 310, which indicates that a read-address may be written to the serial interface registers. Once the Write Bit is set to a "1", the co-processor may transfer a read-address to the serial interface registers 320. After the read-address is written to the serial interface registers, the co-processor issues a "request" 330 for the CPU core to read the memory or I/O address contained within the serial interface registers and return the corresponding data to the serial interface registers.

In one embodiment the "request" from the co-processor is an interrupt generated by an APIC associated with the co-processor. The interrupt is decoded by an APIC associated with the microprocessor which generates an interrupt to the CPU core, causing an interrupt service routine 340 to be executed. The CPU core then reads the memory or I/O location indicated by the read-address. In one embodiment, the data may be read from the CPU cache, system memory, or an I/O resource, such as a hard disk, depending on the read-address. If the read-address is within the CPU cache memory range 350, the data is read from the CPU cache 360. If the address is within the system memory range 370, the read-address is forwarded to the MCH, which may arbitrate 380 between the co-processor and other devices for access to system memory. The MCH then reads 390 data corresponding to the read-address within system memory. If the read-address is not within the system memory range, the data is forwarded to the ICH which may arbitrate 3100 between the co-processor and other system devices for access to I/O resources. The ICH then reads 3110 the data corresponding to the read-address within an I/O resource, such as a hard disk and writes the data to the serial interface registers, where it will be retrieved by the co-processor. Once the Read Bit is then set to "1" 3120, indicating to the co-processor that valid data is available, the co-processor reads the data 3130 from the serial interface registers.

The invention disclosed herein enables an "asymmetric" co-processor to directly invoke microprocessor resources in order to directly access system memory and I/O resources while avoiding the system cost and power consumption associated with placing the co-processor on the microprocessor's Front Side Bus (FSB) or using costly local memory 19. A co-processor refers to a programmable device capable of reading and executing instructions within a computer program that either uses microprocessor resources or whose resources are used by a microprocessor to perform a task. An "asymmetric" co-processor refers to a co-processor whose bus-interface architecture is not equivalent to that of the microprocessor or microprocessors residing on the same bus. System cost is further reduced by the reduced pin-count associated with interfacing the co-processor serially with the microprocessor. System power is reduced by the reduction of logic required to implement the serial interface relative to that required to interface the co-processor to the FSB. The above embodiment also eliminates the need for additional CPU cache coherency logic since the CPU is made aware of data transfers through a series of interrupts rather than asynchronously driving data transfers cycles onto an FSB.

One embodiment may be implemented with only one modification to an existing microprocessor architecture, that the serial interface registers must be included with the CPU's machine state register file. However, these registers may be read and written using existing RDMSR and WRMSR instructions associated with Intel® 32-bit and 64-bit microprocessors.

The method and apparatus disclosed herein may be integrated into advanced Internet- or network-based knowledge systems as related to information retrieval, information extraction, and question and answer systems. FIG. 1 is an example of one embodiment of a computer system. The system shown has a microprocessor coupled to a front-side bus. Also shown coupled to the bus are a system memory which may contain instructions. Additional components shown coupled to the bus is a MCH. Of course, an exemplary computer system could have more components than these or a subset of the components listed.

The method described above can be stored in the memory of a computer system (e.g., set top box, video recorders, etc.) as a set of instructions to be executed. In addition, the instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

What is claimed is:

1. A microprocessor comprising:
   at least one CPU core, said CPU core including at least one arithmetic logic unit (ALU) to perform arithmetic and logical operations and at least one control unit to execute one or more instructions optionally via said at least one ALU;
   at least one set of serial interface registers, said at least one set of serial interface registers being coupled to said CPU core, said at least one set of serial interface registers being contained within at least one set of machine state registers;
   at least one serial interface unit, said at least one serial interface unit being coupled to said at least one set of serial interface registers and said at least one serial interface unit being capable of communicating with at least one co-processor.

2. The microprocessor of claim 1 wherein said at least one co-processor is asymmetric to said at least one microprocessor.

3. The microprocessor of claim 2 further comprising at least one Advanced Programmable Interrupt Controller (APIC), said at least one APIC being coupled to said at least one CPU core and capable of interacting via interrupts with said at least one co-processor.

4. The microprocessor of claim 3 wherein said at least one APIC receives interrupt signals from said at least one co-processor.

5. The microprocessor of claim 4 wherein said at least one set of serial interface registers contain data or address information intended for or transmitted by said at least one co-processor.

6. The microprocessor of claim 1 wherein said at least one co-processor is a communications processor.

7. A method comprising:
   a first transferring of data from at least one co-processor to at least one memory or Input/Output (I/O) resource, said first transferring of data comprising at least one serial transmission of data from said at least one co-processor to at least one microprocessor including at least one CPU core having at least one arithmetic logic unit (ALU) to perform arithmetic and logical operations and at least one control unit to execute one or more instructions optionally via said at least one ALU, at least one set of serial interface registers coupled to said CPU core, said at least one set of serial interface registers being contained within at least one set of machine state registers, and at least one serial interface unit coupled to said at least one set of serial interface registers, said at least one serial interface unit being capable of communicating with said at least one co-processor; and a second transferring of data from at least one memory or I/O resource to at least one co-processor, said second transferring of data comprising at least one serial transmission of data from said at least one microprocessor to said at least one co-processor.

8. The method of claim 7 wherein said first transferring of data further comprises a request to said at least one microprocessor to transmit data from said at least one microprocessor to said at least one memory or I/O resource, said request occurring subsequently to said data being transmitted serially from said at least one co-processor to said at least one microprocessor.

9. The method of claim 8 wherein said data is transmitted to said at least one memory or I/O resource by said at least one microprocessor as a result of said request.

10. The method of claim 9 wherein said request is made by said at least one co-processor.

11. The method of claim 10 wherein said co-processor is a communications processor.

12. The method of claim 7 wherein said second transferring of data further comprises a request to said at least one microprocessor to transmit data from said at least one memory or I/O resource to said at least one microprocessor, said data being subsequently transmitted serially to said at least one co-processor.

13. The method of claim 12 further comprising transmitting said data from said at least one memory or I/O resource to said at least one microprocessor as a result of said request.

14. The method of claim 13 wherein said request is made by said at least one co-processor.

15. The method of claim 14 wherein said co-processor is a communications processor.

16. A system comprising:
    at least one microprocessor including
        at least one CPU core having at least one arithmetic logic unit (ALU) to perform arithmetic and logical operations and at least one control unit to execute one or more instructions optionally via said at least one ALU,
        at least one set of serial interface registers coupled to said CPU core, said at least one set of serial interface registers being contained within at least one set of machine state registers, and
        at least one serial interface unit coupled to said at least one set of serial interface registers;
    at least one co-processor, said at least one co-processor being coupled to said at least one microprocessor to have serial communication between said at least one co-processor and said at least one microprocessor; and
    at least one memory or I/O resource, said at least one memory or I/O resource being coupled to said at least one microprocessor.

17. The system of claim 16 wherein data is transferred between said at least one microprocessor and said at least one co-processor serially.

18. The system of claim 17 wherein at least one Advanced Programmable Interrupt Controller (APIC) is coupled with each of at least one said microprocessor and said at least one co-processor.

19. The system of claim 18 wherein said at least one co-processor is a communications processor.

20. A computer-readable medium having stored thereon a set of instructions, said set of instructions, which when executed by a processor, cause said processor to perform operations comprising:
    a first transferring of data from at least one co-processor to at least one memory or Input/Output (I/O) resource, said first transferring of data comprising at least one serial transmission of data from said at least one co-processor to at least one microprocessor including
        at least one CPU core having at least one arithmetic logic unit (ALU) to perform arithmetic and logical operations and at least one control unit to execute one or more instructions optionally via said at least one ALU,
        at least one set of serial interface registers coupled to said CPU core said at least one set of serial interface registers being contained within at least one set of machine state registers, and
        at least one serial interface unit coupled to said at least one set of serial interface registers, said at least one serial interface unit being capable of communicating with said at least one co-processor; and
    second transferring of data from at least one memory or I/O resource to at least one co-processor, said second transferring of data comprising at least one serial transmission of data from said at least one microprocessor to said at least one co-processor.

21. The computer-readable medium of claim 20 wherein said first transferring of data further comprises a request to said at least one microprocessor to transmit data from at least one microprocessor to said at least one memory or I/O resource, said request occurring subsequently to said data being transmitted serially from said at least one co-processor to said at least one microprocessor.

22. The computer-readable medium of claim 21 wherein said data is transmitted to said at least one memory or I/O resource by said at least one microprocessor as a result of said request.

23. The computer-readable medium of claim 22 wherein said request is made by said at least one co-processor.

24. The computer-readable medium of claim 23 wherein said co-processor is a communications processor.

25. The computer-readable medium of claim 20 wherein said second transferring of data further comprises a request to said at least one microprocessor to transmit data from said at least one memory or I/O resource to said at least one microprocessor, said data subsequently being serially transmitted to said at least one co-processor.

26. The computer-readable medium of claim 25 further comprising transmitting said data from said at least one memory or I/O resource to said at least one microprocessor as a result of said request.

27. The computer-readable medium of claim 26 wherein said request is made by said at least one co-processor.

28. The computer-readable medium of claim 27 wherein said co-processor is a communications processor.

\* \* \* \* \*